United States Patent [19]
Knapp

[11] 4,114,929
[45] Sep. 19, 1978

[54] PLASTIC PIPE OR HOSE CONNECTION FOR FUEL CONDUITS

[75] Inventor: Heinrich Knapp, Leonberg, Fed. Rep. of Germany

[73] Assignee: Robert Bosch GmbH, Stuttgart, Fed. Rep. of Germany

[21] Appl. No.: 832,859

[22] Filed: Sep. 13, 1977

Related U.S. Application Data

[63] Continuation of Ser. No. 685,802, May 12, 1976, abandoned.

[30] Foreign Application Priority Data

Aug. 13, 1975 [DE] Fed. Rep. of Germany ....... 2536017

[51] Int. Cl.² .................................................. F16L 11/12
[52] U.S. Cl. ...................................... 285/45; 285/174; 285/256; 285/423
[58] Field of Search .................. 285/256, 174, 45, 381, 285/DIG. 10, 423; 164/54, 26; 138/145, 146, 104, 149; 252/3, 4, 8.1; 106/15 FP

[56] References Cited

U.S. PATENT DOCUMENTS

| | | | |
|---|---|---|---|
| 2,401,921 | 6/1946 | Fisher et al. | 285/256 |
| 3,285,640 | 11/1976 | Storch | 285/45 |
| 3,442,537 | 5/1969 | Courtot et al. | 285/256 |
| 3,565,116 | 2/1971 | Gabin | 285/45 |
| 3,769,079 | 10/1973 | Roth | 252/8.1 |
| 3,784,236 | 1/1974 | Slocum | 285/45 |
| 3,794,360 | 2/1974 | Bachle et al. | 285/286 |
| 3,863,958 | 2/1975 | Todd | 285/12 |

*Primary Examiner*—Dave W. Arola
*Attorney, Agent, or Firm*—Edwin E. Greigg

[57] ABSTRACT

The invention refers to a plastic pipe or hose connection arrangement for fuel conduits for use in motor vehicles, and in particular for fuel conduits in a fuel injection installation with a hose spout carried by a connecting piece, on to the nipple of which the pipe or hose end is pushed.

6 Claims, 3 Drawing Figures

U.S. Patent  Sept. 19, 1978  4,114,929

PLASTIC PIPE OR HOSE CONNECTION FOR FUEL CONDUITS

This is a continuation of application Ser. No. 685,802 filed May 12, 1976 and now abandoned.

BACKGROUND OF THE INVENTION

A connection of this sort is known for general application (DT-OS 21 37 062). If these connections are used in fuel injection installations of motor vehicles fire protection is a problem. There are safety regulations, which, in the event of fire, provide a definite time limit for the exit of the fuel from the conduits or pipe connections. In addition, the heat from the fire should be delayed as much as possible from penetrating into the conduits and connections. Finally, it is important that pipe connections supplying fuel should be sufficiently secure and leakproof to ensure safety in a collision with an obstacle.

OBJECT AND SUMMARY OF THE INVENTION

The basic aim of the invention is to avoid the indicated problems and difficulties and to construct a connection of the type previously mentioned, designed to comply with the fire protection safety regulations.

In order to fulfill this aim, according to the invention the connection piece, the pipe or hose and the spout are enclosed in a pipe-like rubber protective sleeve in a leakproof and secure manner.

Advantageous further developments of the subject of the invention result from the subclaims.

The invention will be better understood as well as other objects and advantages thereof become more apparent from the following detailed description of the invention taken in conjunction with the drawing.

DESCRIPTION OF THE PREFERRED EMBODIMENT

Figure 1:
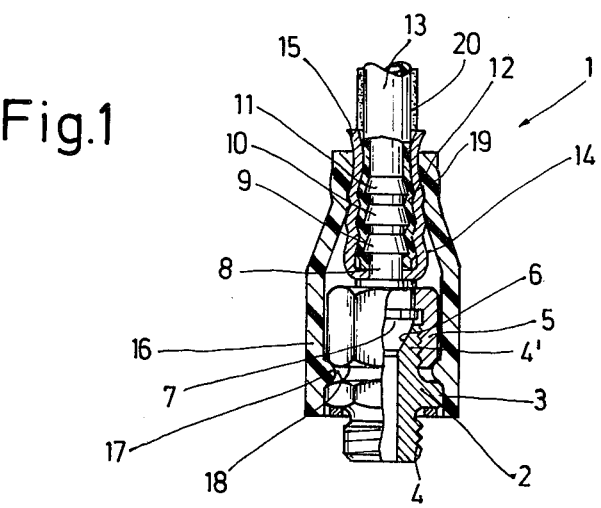
FIG. 1 is a cross-sectional view of a hose connection with a sheet metal sleeve and an outer protective sleeve.

Turning now to the drawings, a hose connection is generally shown at 1 and includes a threaded nipple 2, the intermediate area of which is provided with a hexagonal portion 3, the oppositely disposed threaded portions of the nipple being denoted as 4 and 4', respectively. The uppermost portion of the threaded nipple is provided with an annular tapered surface 6 into which the lower end of the nipple 7 is inserted and securely fastened in a leakproof manner by the connecting nut 5.

The upper portion of nipple 7 is constructed as shown, being provided with a cylindrical neck element 8 that is integral with vertically spaced annular ridges 9, 10 and 11, the diameters of each of which decrease toward the upper end of the nipple. The nipple 8 is seated firmly in the end 12 of hose 13 by hammering or other force-exerting means. It will be apparent that upon assembling the hose 13 with nipple 7, the annular ridges 9, 10 and 11 will dig into the internal wall of the hose.

Subsequent to securing the nipple 7 in the end of hose 13, a sheet metal sleeve 14 is positioned around the hose contiguous to the nipple 7 and clamped to the hose by a special plier-type pressure applying means which exerts a radial tension so that the ridges 9, 10 and 11 of the nipple 7 are firmly seated in he interior wall of the hose 13. The upper end of the sheet metal sleeve 14 has an annular cup-shaped area 15 which curves outwardly away from the hose 13 to thereby prevent sharp bends from occurring in the hose.

As clearly shown in the drawings, a protective rubber sleeve 16 is arranged to encompass substantially all of the metal sleeve 14, the nut 5 and the hexagonal area of the nipple 2, the internal wall of the rubber sleeve including an annular protuberance 17 which projects into the space between the lower extremity of the nut 5 and the hexagonal area of the threaded nipple 2. It will be noted that the protective sleeve 16 has a constricted neck portion 19 that exerts an inward tension on and conforms to the contour of the sleeve 14.

The hose end 12 is provided with a plastic coating 20, known per se, which foams as the result of heat.

Figure 2:
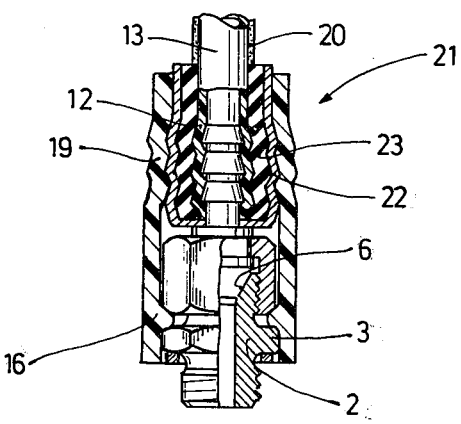
FIG. 2 is a cross-sectional view of a further embodiment of this invention.

In the hose connection 21, according to FIG. 2, which uses broadly the same reference numerals as in the hose connection 1, a hose section 23 is provided in addition to a sheet metal sleeve 22. This hose section in common with the sheet metal sleeve 22 exerts a radial tension by reason of its inherent elasticity.

Figure 3:
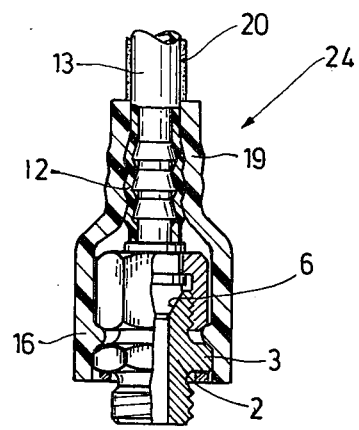
FIG. 3 is a cross-sectional view of still another embodiment of this invention.

Finally, FIG. 3 shows a hose connection 24, from which the sheet metal sleeves 14 and 22 and the hose section 23 have been completely omitted. In this embodiment, the inward tensioning parts 19 of the protective sleeve 16 is in direct contact with the lower end of hose 12. By using the foamable plastic coating 20 and the protective sleeve 16 supplemented, if applicable, by the sheet metal sleeves 14 or 22 and by the hose section 23, the penetration of heat to the critical sealing points of the hose reinforcement is successfully greatly delayed, so that the safety regulations concerning fuel injection installations which specify a definite time until the possible exit of the fuel can easily be complied with. Moreover, the strength of this type of connection is improved.

It is obvious that the connection can be used not only for a hose 13, but also for a plastic pipe.

What is claimed is:

1. In a coupling for plastic tubes or hoses intended for use in fuel conduits of motor vehicles, especially the fuel lines of a fuel injection system, including: a tube engaging nipple; a further nipple; and connecting means for connecting the two nipples, the improvement comprising:

a pipe-like protective rubber sleeve surrounding at least part of the tube engaging nipple and the further nipple and the connecting means, said sleeve having spaced apart sealing means, on either side of the connection of the two nipples, wherein the connecting means and the further nipple together define a sealing space, wherein one of the sealing means comprises an annular protuberance which is received within the sealing space and engages therein the connecting means and the further nipple, and wherein the other sealing means comprises an inwardly elastic tensioning portion of the sleeve adjacent the tube engaging nipple which is capable of adapting to the contour of the surface to which it is affixed.

2. A coupling as defined by claim 1, the improvement further comprising: a covering of synthetic material which foams when subjected to heat, said covering being applied to the tube end engaged by the tube engaging nipple.

3. A coupling as defined by claim 1, the improvement further comprising: a sheet-metal bushing which produces a radial tension to thereby clamp a tube to the tube engaging nipple said sheet-metal bushing positioned between the tube and tensioning portion of the sleeve.

4. A coupling as defined by claim 3, the improvement further comprising: a covering of synthetic material which foams when subjected to heat, said covering being applied to the tube end engaged by the tube engaging nipple.

5. A coupling as defined by claim 3, the improvement further comprising: an elastic sleeve positioned between the sheet-metal bushing and tube which together with the sheet-metal bushing produces a radial tension to thereby clamp a tube to the tube engaging nipple.

6. A coupling as defined by claim 5, the improvement further comprising: a covering of synthetic material which foams when subjected to heat, said covering being applied to the tube end engaged by the tube engaging nipple.

* * * * *